United States Patent Office 3,519,632
Patented July 7, 1970

3,519,632
3-NITROSTRYCHNINE DERIVATIVES FOR THE DENATURATION OF ALCOHOL
Enzo Tedeschi, Tel Aviv, Israel, assignor to Plantex Ltd., Nathanya, Israel, an Israeli company
No Drawing. Filed Nov. 29, 1966, Ser. No. 597,560
Claims priority, application Israel, Jan. 14, 1966, 24,976
Int. Cl. C07d 43/34
U.S. Cl. 260—286                                       5 Claims

ABSTRACT OF THE DISCLOSURE

Compounds of 3-nitrostrychnine derivatives useful as ethanol denaturants are disclosed.

---

The present invention concerns the denaturation of ethyl alcohol. The invention also concerns novel strychnine derivatives and their salts suitable, inter alia, for use as denaturants for ethyl alcohol.

In most countries it is customary to denature ethyl alcohol used for industrial purposes in order to render it unsuitable for drinking, for the reason that the excise due on alcohol for industrial purposes is considerably lower than on alcohol fit for drinking. For the denaturation of alcohol there exist certain rules. According to one of these, applicable where the denaturant is bitter, its bitter taste must be so pronounced so that even when the denaturant is contained in the alcohol in such small quantities as not to interfere with the industrial and scientific applications of the alcohol it imparts to the latter a bitter taste which renders the alcohol unsuitable for drinking. Moreover, the denaturant must be non-toxic in the concentration in which it is used.

In several countries, e.g. the U.S.A., brucine or its salts are used for the denaturation if alcohol destined for use in industry, for example the cosmetic industry Brucine is .used because of its strong bitterness which is still felt at a concentration as low as 1.50 avoirdupois ounces/100 gallons, and because of its non-toxicity at such a concentration.

In recent years the supply of brucine has not been meeting the demands. Moreover, the price of brucine is high and is reflected in the price of denatured alcohol sold to the industry. For these reasons there has developed an ever increasing demand for a substitute for brucine.

It is the object of the present invention to provide a new method for the denaturation of ethyl alcohol.

It is a further object of the present invention to provide novel compounds which can be used, among others, for the denaturation of ethyl alcohol.

Brucine is the 2,3-dimethoxy derivative of strychnine but is 100–130 times more bitter and at the same time about 50 times less toxic than the latter. It was thus to be assumed that the 2,3-substitution of the strychnine molecule accounted for both the increase of bitterness and the decrease of toxicity. However, experiments conducted in accordance with the present invention showed that when one or both of the 2,3-methoxy groups was or were replaced by another substituent the degree of bitterness was as a rule only slightly higher, if at all, than that of strychnine.

It was, therefore, quite surprising to find, in accordance with the present invention, that from among the very large number of possible strychnine derivatives, the 3-nitro derivatives excel over all others in that their degree of bitterness is from 50 to 700 times higher than that of strychnine itself. It has further been found in accordance with the invention, that the 3-nitro-strychnine derivatives are of a sufficiently low toxicity to enable their use for the denaturation of alcohol.

The bitterness of a denaturant is determined by preparing solutions of various concentrations of the denaturant in 95% alcohol and then diluting the various solutions with water to an alcohol content of 25%. The dilute solutions are then tasted by a panel of at least ten tasters and a result is considered positive when the tasting test produces an immediate impact of bitterness. The relative degrees of bitterness, as between the several denaturants, were established by comparing the concentration of their aqueous solutions by which a similar impact of bitterness was obtained. All indications of relative bitterness given herein are based on tests conducted in this manner.

In accordance with the invention there is provided a new method for the denaturation of alcohol comprising incorporating in the alcohol as denaturant in an amount of at least 3/7 avoirdupois ounces/100 gallons a 3-nitrostrychnine derivative of the general Formula I:

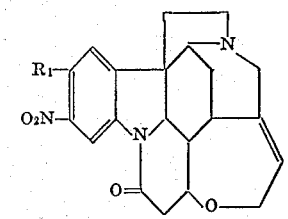

wherein $R_1$ is hydrogen, halogen or a hydroxy, alkoxy, cyano, free or esterified carboxy, primary, secondary or tertiary amino or acylamino groups; or an acid addition salt of any such compound.

The above minimum content of the denaturant of Formula I applies to cases where no other denaturant is added. It is, however, also possible, in accordance with the invention, to use a denaturant of Formula I in combination with another denaturant, e.g. tert, butyl alcohol. In such cases the content of the denaturant of Formula I may be below 3/7 avoirdupois ounces/100 gallons.

In many cases the free bases of the above Formula I are only of very low solubility in alcohol and therefore the use of their acid adition salts will be preferred. As a rule such salts will have to be selected which are not decomposed by the alcohol.

It has further been found that while some such salts can be dissolved directly in alcohol, others cannot and have to be introduced into the alcohol in the form of a concentrated aquous solution. It has surprisingly been found in accordance with the invention that many salts of compounds of the above Formula I which are introduced in this manner into the alcohol do not decompose in the latter and remain in solution therein even though they cannot be dissolved directly in the alcohol. This seems to apply in particular to salts of compounds of Formula I with comparatively weak acids such as, for example, acetic acid and lactic acid.

From among the various bases of Formula I and their salts that can be used as denaturants in accordance with the invention, -nitrostrychnine, 2-bromo-3-nitro-strychnine, 2-amino-3-nitrostrychine and the sulfuric acid addition salt of the latter have been described in literature (Rosenmund and Franke, Ber. 97, 1677 (1964). There is, however, no mention in the literature that any of these compounds is suitable for the denaturation of alcohol which has been found for the first time in accordance with the present invention.

It has been found, in accordance with the invention, that very good denaturation effects are obtained with salts of 2-amino-3-nitrostrychnine which is one of the compounds of Formula I. This is shown in the following Table which lists the alcohol solubilities of some acid addition salts of 2-amino-3-nitrostrychnine as well as their degrees of bitterness. The reference bitterness is that of brucine.$H_2SO_4$ which is defined as 100, the relative degrees of bitterness having been established in the manner outlined hereinbefore.

TABLE—SOLUBILITIES AND DEGREES OF BITTERNESS OF VARIOUS ACID ADDITION SALTS OF 2-AMINO-3-NITROSTRYCHNINE

| Acid | Solubility in cold water in percent | Solubility in boiling water in percent | Solubility in cold ethanol in percent | Solubility in boiling ethanol in percent | Degree of bitterness |
|---|---|---|---|---|---|
| Sufuric | 0.1 | 5 | <0.05 | <0.05 | 500 |
| Hydrochloric | 7.7 | 100 | 0.1 | 1.2 | 350 |
| Lactic | 40 | 100 | (*) | (*) | 250 |
| Acetic | 20 | 100 | (*) | (*) | 350 |
| Trichloro acetic | 0.2 | 3.3 | 0.1 | 1.4 | 400 |
| Succinic | 5.5 | 100 | 0.7 | 8.3 | 80 |

*Cannot be dissolved directly in alcohol but remains in alcoholic solution when introduced into alcohol in form of a concentrated aqueous solution.

It is seen that all the above salts, with the exception of the succinate, have a considerably higher degree of bitterness than brucine, and a solubility in ethanol which is quite sufficient for denaturation purposes.

All the salts listed in the table above, except the addition salt with sulfuric acid, are novel compounds. They can all be prepared in a simple manner. Thus the addition salt with hydrochloric acid can be prepared by boiling the base with a large excess of 5–10% aqueous hydrochloric acid, filtering the resulting solution in order to remove any undissolved matter, and cooling the clear filtrate whereupon the desired hydrochloride precipitates. Alternatively, it is also possible to treat 2-acetylamino-3-nitro strychnine with 2 N-hydrochloric acid.

In a similar manner the addition salts with lactic, acetic, trichloro acetic acid, succinic and benzoic acid are prepared by treating the free base with the respective acids.

An additional novel salt provided in accordance with the invention and useful in the denaturation of ethyl alcohol is 2 - amino-3-nitro-strychnine dimethylsulfate. This salt can be prepared by admixing a 10% excess of dimethylsulfate to 2-amino-3-nitrostrychnine in chloroform:methanol 1:1, or in acetone.

Another compound very useful as a denaturant is 3-nitrostrychnine. Its degree of bitterness is 130 (brucine.$H_2SO_4$=100) and it has the great advantage that alcohol denatured with it in colourless.

The invention also concerns novel 3-nitro-stychnine derivatives of the general Formula II

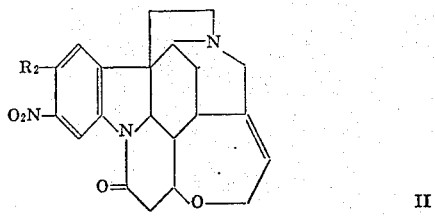

in which $R_2$ is chlorine, iodine, fluorine or a hydroxy, alkoxy, cyano, free or esterified carboxy, secondary or tertiary amino or acyl amino group; and their acid addition salts.

These novel compounds of Formula II are useful denaturants for alcohol. They can also be used as intermediates in various organic syntheses as well as in pharmacy.

The 3-nitrostrychnine derivatives of Formula I and their acid addition salts used as denaturants in accordance with this invention are sufficiently non-toxic so that the denatured alcohol can be used quite safely without any danger to the workers or consumers.

The following examples, to which the invention is not limited, illustrate the preparation of some of the novel 3-nitrostrychnine derivatives according to the invention of Formula II above.

EXAMPLE 1

2-chloro-3-nitrostrychnine 15 g. of 2-amino-3-nitrostrychnine is dissolved in 500 ml. of a 2 N-sulfuric acid and is diazotized in this solution at a temperature of 35–60° C. by means of a 5% aqueous $NaNO_2$ solution. The resulting diazonium salt is introduced gradually into a solution of 6 g. of CuCl in 250 ml. of concentrated hydrochloric acid and the reaction mixture is heated at 90° C. for 1 hour. Thereafter any undissolved matter is removed by filtration, the filtrate is poured on ice and the pH is raised to 8–9 by the addition of ammonia. The precipitate thereby produced is isolated by filtration, dissolved in chloroform, the chloroform solution is dried, filtered and from the filtrate the solvent is evaporated to dryness. In this manner there is obtained 11 grams of crude 2-chloro-3-nitrostrychnine which is further purified by chromatography on $Al_2O_3$ or by recrystallization from dimethyl formamide.

Solubility in water 0.1%
Solubility in ethanol 0.1%
Bitterness 50 (brucine.$H_2SO_4$=100)
$[\alpha]_D^{20} = -118$ (c.=2% in $CHCl_3$)
N.M.R.—spectrum:
  Singlettes at 442 and 512 c.p.s. (2 aromatic H)
  Multiplette at 363 c.p.s. (1 vinylic H)

By an alternative procedure, 15 g. of 2-amino-3-nitrostrychnine is dissolved in 200 ml. of acetic acid and diazotized at 15 to 20° C. by means of a solution of 3.5 g. of $NaNO_2$ in 60 ml. of concentrated $H_2SO_4$. The resulting diazonium salt is then introduced gradually into a solution of 15 g. of CuCl in concentrated hydrochloric acid. The process is then continued as described above.

The hydrochloride of the above base is prepared by dissolving the base in an anhydrous alcoholic HCl solution and evaporating the solvent to dryness.

The solubility of the hydrochloride in cold water is 100%, in cold ethanol 50%, and its degree of bitterness is 30.

Any other salts, organic or inorganic can be prepared in an analogous manner.

EXAMPLE 2

2-hydroxy-3-nitrostrychnine

This compound is prepared by diazotation of a solution of 15 g. of 2-amino-3-nitrostrychnine in 10%-by-weight aqueous $H_2SO_4$ with a 30% aqueous $NaNO_2$ solution. The diazonium salt obtained is introduced gradually into 66%-by-weight aqueous $H_2SO_4$ solution which is heated at 135° C. After the completion of the reaction, the reaction mixture is cooled, neutralized with ammonia and extracted with chloroform. From the clean and dry chloroform solution the product is recovered by evaporation of the solvent.

EXAMPLE 3

2-cyano-3-nitrostrychnine 15 g. of 2-amino-3-nitrostrychnine is dissolved in 200 ml. of 2 N-HCl and diazotized with 4 g. of $NaNO_2$ in 15 ml. of water at a temperature of 30–50° C. The reaction solution is then neutralized with $NaCO_3$ and then introduced dropwise into a solution of sodium cuprocyanide in chloroform which is heated at 80–90° C. After the reaction is completed the reaction mixture is cooled and filtered. The chloroform layer is separated and the aqueous phase is made alkaline and extracted with some more chloroform. The combined chloroform solutions are dried and the product, 2-cyano-3-nitrostrychnine, is recovered therefrom by evaporation of the solvent.

EXAMPLE 4

2-methoxy-3-nitrostrychnine 11 g. of 2-methoxystrychnine is introduced into 85 cc. of water and the mixture is boiled. The pH of the mixture is adjusted to about 3.0 by the addition of 16 cc. of 2 N HNO$_3$. The resulting clear solution is cooled and the resulting crystalline precipitate is filtered off and washed with water and acetone. In this manner 10 g. of the HNO$_3$-addition salt of 2-methoxystrychnine is obtained.

This addition salt is dissolved in 50 cc. of 70% H$_2$SO$_4$ by gradually adding it to the acid which is maintained all the time at 0° C. When the admixture is completed the solution is kept for another hour at 0° C. and is then diluted by the addition of the same volume—about 50 cc.—of water. The solution is then heated to about 70–80° C. and ammonia is added until the pH reaches about 7–8. Upon cooling there is obtained a yellow crystalline precipitate which is filtered off and washed with water and acetone.

Yield—7 g.
Degree of bitterness—100 (brucine.H$_2$SO$_4$=100)
N.M.R spectrum:
  Singlettes at 415 and 509 c.p.s. (2 aromatic H)
  Singlettes at 237 c.p.s. (3 H of methoxyl)
  Multiplette at 355 c.p.s. (1 vinylic H)

EXAMPLE 5

2-acetylamino-3-nitrostrychnine 2 kg. of the addition salt of acetylamino strychnine with nitric acid is converted into 2-acetyl-3-nitrostrychnine by the method described by Rosenmund and Franke in Ber. 97, 1677 (1964). The crude product was puraified by chromatography on alumina.

M.P. 208–209° C.; solubility in cold ethanol 1.4%; Degree of bitterness 15 (brucine.H$_2$SO$_4$=100).

EXAMPLE 6

2-dimethylamino-3-nitrostrychnine 22 g. of the addition salt of 2-amino-3-nitrostrychnine with sulfuric acid is dissolved in a mixture of 30 ml. of 30% formaldehyde and 240 ml. of formic acid and the solution is refluxed. Thereafter the solution is neutralized with ammonia, the resulting precipitate is dissolved in chloroform and from the resulting chloroform solution the solvent is evaporated. The residue is extracted with benzene and the benzene solution is purified by chromatography on Al$_2$O$_3$. From the purified benzene solution the product is isolated by evaporation of the solvent.

Solubility in the cold: Percent
  In water _____ 25
  In ethanol _____ 1.4

Degree of bitterness 60 (brucine.H$_2$SO$_4$=100).
N.M.R. spectrum:
  Singlettes at 410 and 503 c.p.s. (2 aromatic H)
  Singlette at 170 c.p.s. (6 H of dimethyl)
  Multiplette 353 c.p.s. (1 vinylic H)

EXAMPLE 7

The following are examples for the denaturation of alcohol in accordance with the invention.

To every 100 gallons of alcohol there was added:

(a) ¾ avoirdupois ounces of 2-amino-3-nitrostrychnine lactate. The lactate was first dissolved in 100 ml. of water and the resulting aqueous solution was then admixed to the alcohol.

(b) ⅜ avoirdupois ounces of 2-amino-3-nitrostrychnine hydrochloride. The hydrochloride was first dissolved in 1 gallon of alcohol at 70° C. and the resulting alcoholic solution is then admixed to the remaining 99 gallons of alcohol.

(c) ½ avoirdupois ounces of 2-amino-3-nitrostrychnine acetate and ⅛ gallon of tert.butanol. The acetate was first dissolved in 100 ml. of cold water and the resulting aqueous solution is then admixed to the alcohol together with the butanol.

(d) 1.5 avoirdupois ounces of 3-nitrostrychnine acetate. The acetate was first dissolved in 500 ml. of cold water and the resulting aqueous solution was then admixed to the alcohol.

(e) 1.25 avoirdupois ounces of 2-chloro-3-nitrostrychnine hydrochloride and ⅛ gallon of tert.butanol.

(f) 2 avoirdupois ounces of 2-dimethylamino-3-nitrostrychnine acetate. The acetate was first dissolved in 500 ml. of cold water and the resulting aqueous solution was then admixed to the alcohol.

(g) 1.5 avoirdupois ounces of 2-methoxy-3-nitrostrychnine acetate. The acetate was first dissolved in 500 ml. of cold water and the resulting aqueous solution was then admixed to the alcohol.

I claim:
1. 2-methoxy-3-nitrostrychnine.
2. The addition salt of 2-amino-3-nitrostrychnine with lactic acid.
3. The addition salt of 2-amino-3-nitrostrychnine with acetic acid.
4. The addition salt of 2-amino-3-nitrostrychnine with trichloro acetic acid.
5. The addition salt of 2-amino-3-nitrostrychnine and dimethylsulfate.

References Cited

Rosemund et al. α-Colubrine from Strychnine, Chem. Abstracts 61, August 1964 (p. 4408 relied on).

ALEX MAZEL, Primary Examiner

A. MARIE T. TIGHE, Assistant Examiner

U.S. Cl. X.R.

252—366; 260—287, 288